(12) United States Patent
Kawai et al.

(10) Patent No.: US 10,208,246 B2
(45) Date of Patent: Feb. 19, 2019

(54) METHOD FOR MANUFACTURING ALKALI HALIDE-BASED SCINTILLATOR POWDER AND METHOD FOR MANUFACTURING SCINTILLATOR MATERIAL

(71) Applicants: OSAKA PREFECTURE UNIVERSITY Public Corporation, Sakai-shi (JP); YASU MEDICAL IMAGING TECHNOLOGY CO., LTD., Yasu-shi (JP)

(72) Inventors: Taketoshi Kawai, Osaka (JP); Fumiaki Kunimoto, Shiga (JP)

(73) Assignees: OSAKA PREFECTURE UNIVERSITY Public Corporation, Sakai-shi (JP); YASU MEDICAL IMAGING TECHNOLOGY CO., LTD., Yasu-shi (JP)

( * ) Notice: Subject to any disclaimer, the term of this patent is extended or adjusted under 35 U.S.C. 154(b) by 525 days.

(21) Appl. No.: 14/901,496

(22) PCT Filed: Oct. 21, 2014

(86) PCT No.: PCT/JP2014/077982
§ 371 (c)(1),
(2) Date: Dec. 28, 2015

(87) PCT Pub. No.: WO2016/063357
PCT Pub. Date: Apr. 28, 2016

(65) Prior Publication Data
US 2016/0280992 A1    Sep. 29, 2016

(51) Int. Cl.
*C09K 11/62* (2006.01)
*B32B 37/10* (2006.01)
*C09K 11/61* (2006.01)

(52) U.S. Cl.
CPC .......... *C09K 11/628* (2013.01); *B32B 37/10* (2013.01); *C09K 11/616* (2013.01); *B32B 2307/416* (2013.01)

(58) Field of Classification Search
None
See application file for complete search history.

(56) References Cited

U.S. PATENT DOCUMENTS

2003/0150994 A1* 8/2003 Freund ............... G01T 1/2018
                                                       250/368
2014/0203211 A1  7/2014 Totsuka et al.

FOREIGN PATENT DOCUMENTS

CN   101967678 A   2/2011
JP   05-060871 A   3/1993
(Continued)

OTHER PUBLICATIONS

Machine Translation of JP-5603461, Date Unknown.*
(Continued)

*Primary Examiner* — Jeffry H Aftergut
(74) *Attorney, Agent, or Firm* — Oblon, McClelland, Maier & Neustadt, L.L.P.

(57) ABSTRACT

An additive containing an ion as a luminescence center is added to alkali halide powder as a base material. Mechanical energy for applying an impact force, a shearing force, a shear stress, or a friction force is applied so as to grind or mix the alkali halide powder and the additive. The ion as the luminescence center is doped into the alkali halide as the base material so as to obtain alkali halide-based scintillator powder. With this process, the alkali halide-based scintillator powder can be manufactured at a room temperature in the atmospheric air without any complicated condition control or any process at a high temperature under high vacuum and a large-sized scintillator sheet can be produced.

12 Claims, 6 Drawing Sheets

(56) References Cited

FOREIGN PATENT DOCUMENTS

| | | |
|---|---|---|
| JP | 05-188148 A | 7/1993 |
| JP | 2003-014850 A | 1/2003 |
| JP | 2003-147343 A | 5/2003 |
| JP | 2012-098110 A | 5/2012 |
| JP | 5594799 B2 | 8/2014 |
| JP | 5603461 B * | 8/2014 |
| JP | 5603461 B1 | 10/2014 |
| KR | 10-2012-0008873 A | 2/2012 |

OTHER PUBLICATIONS

Combined Office Action and Search Report dated Dec. 30, 2016 in Chinese Patent Application No. 201480035683.2 (with English translation of Categories of Cited Documents).

Taketoshi Kawai, et al., "Comparison of Luminescence Properties of CsI Crystals Activated with Ag-, Au-, Tl$^+$ Ions at Room Temperature" Japanese Journal of Applied Physics, vol. 52, 2013, pp. 082401-1-082401-4.

Decision of a Patent Grant dated Aug. 31, 2016 in Korean Patent Application No. 10-2015-7036838.

International Search Report dated Jan. 27, 2015 for PCT/JP2014/077982 filed on Oct. 21, 2015 (with Translation of Category of Cited Documents).

Combined Office Action and Search Report dated Jun. 5, 2017 in Patent Application No. 201480035683.2 (with English translation of Office Action and English translation of categories of cited documents).

* cited by examiner

METHOD FOR MANUFACTURING ALKALI HALIDE-BASED SCINTILLATOR POWDER AND METHOD FOR MANUFACTURING SCINTILLATOR MATERIAL

CROSS-REFERENCE TO RELATED APPLICATIONS

This application is a National Stage of PCT/JP2014/077982, which was filed on Oct. 21, 2014, the entire contents of which are incorporated herein by reference.

FIELD

Embodiments described herein relate generally to a method for manufacturing alkali halide-based scintillator powder and a method for manufacturing a scintillator material.

BACKGROUND

Conventionally, as a method for producing a scintillator using alkali halide as a base material, a vacuum evaporation method of co-evaporating alkali halide as the base material and an additive as a luminescence center in a high-temperature process under high vacuum and a single crystal production method such as Czochralski process (CZ method) have been generally employed.

In the vacuum evaporation method including the high-temperature process at equal to or higher than 600° C. under high vacuum, not only huge thermal energy is consumed but also evaporated substances adhere to various places, and thus there is a problem in that material loss is large. It is also a problem in that it is difficult to control the evaporation speed and concentration of the additive as the luminescence center.

The single crystal production method also has problems in that it is difficult to increase the size of a single crystal production device for the high-temperature process at equal to or higher than 600° C. and it is difficult to produce a large-sized scintillator sheet with uniform crystallinity.

An object of the invention is to provide a method for manufacturing alkali halide-based scintillator powder at a room temperature in the atmospheric air without any complicated condition control, high-temperature process (for example, >600° C.) under high vacuum, and the like, and a method for manufacturing a scintillator material capable of producing a large-sized scintillator sheet using the alkali halide-based scintillator powder.

In the embodiment, a method for manufacturing alkali halide-based scintillator powder comprises: adding an additive containing an ion as a luminescence center to alkali halide powder as a base material so as to be predetermined mol %; and applying mechanical energy for applying an impact force, a shearing force, a shear stress, or a friction force so as to grind or mix the alkali halide powder and the additive and dope the ion as the luminescence center into alkali halide as the base material.

DETAILED DESCRIPTION

Next, embodiments will be described in detail.

Figure 1:
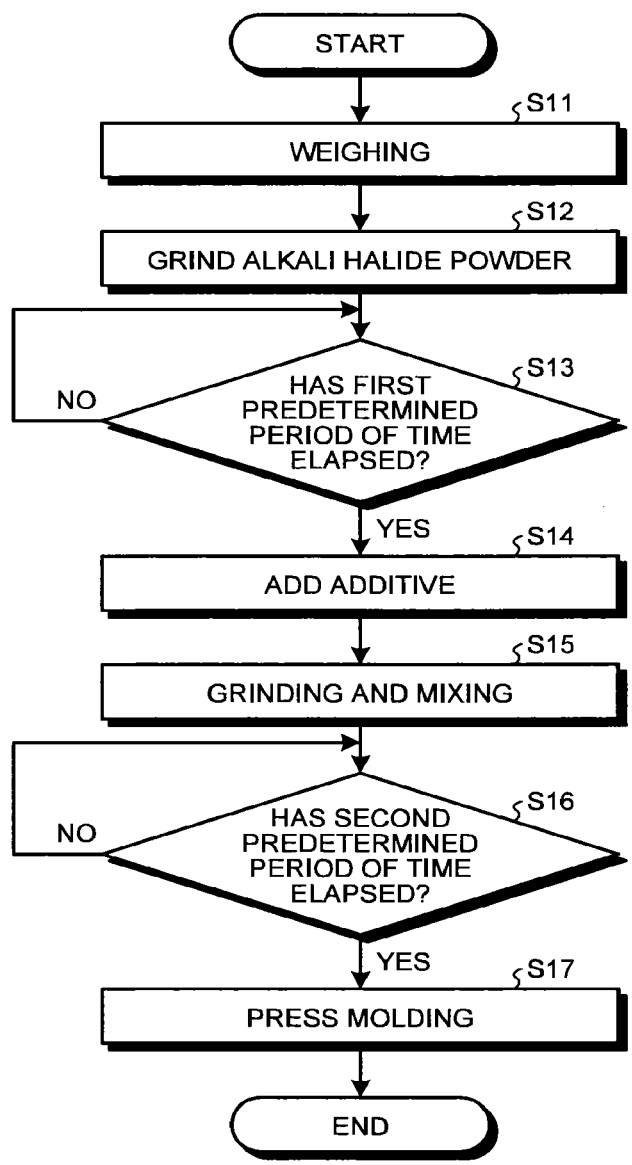
FIG. 1 is a descriptive flowchart for explaining manufacturing procedures of alkali halide-based scintillator powder and a scintillator sheet thereof.

FIG. 1 is a descriptive flowchart for explaining manufacturing procedures of alkali halide-based scintillator powder and a scintillator sheet thereof.

The embodiments employ a mechanochemical process in which alkali halide powder as a base material and an additive as a luminescence center are grinded and mixed and mechanical energy based on an impact force, a shearing force, a shear stress, a friction force, or the like is applied thereto for reaction.

Although operation procedures are divided into a first process and a second process for making the procedures easy to be understood in the following description, both the processes are not necessarily separated clearly and there arises no problem with one process in which the procedures are integrated into one flow.

Furthermore, although an agate mortar (mortar) is used as an example of a device applying mechanical energy for grinding or mixing a material of the alkali halide-based scintillator powder or for applying the impact force, the shearing force, the shear stress, or the friction force in the following description, the device is not limited thereto. For example, these pieces of processing can be performed by a mechanical device such as a tumbling mill, a satellite mill, and a jet mill.

When the mechanical energy for grinding or mixing the material of the alkali halide-based scintillator powder or for applying the impact force, the shearing force, the shear stress, or the friction force is applied, application of the mechanical energy is not limited to between solid substances containing the powder material. It is needless to say that liquid or gas may be interposed between the solid substances as long as mixing, grinding, application of the impact force, application of the shearing force, application of the shear stress, application of the friction force, and the like can be performed efficiently. It is more desirable that the liquid is an organic solvent capable of easy evaporation.

First, in order to manufacture the alkali halide-based scintillator powder, powder of alkali halide as the base material and powder of an additive containing ions as the luminescence center are weighed (step S11).

The powder of alkali halide as the base material includes powder of a material selected from a group of lithium fluoride (LiF), lithium chloride (LiCl), lithium bromide (LiBr), lithium iodide (LiI), sodium fluoride (NaF), sodium chloride (NaCl), sodium bromide (NaBr), sodium iodide (NaI), potassium fluoride (KF), potassium chloride (KCl), potassium bromide (KBr), potassium iodide (KI), rubidium fluoride (RbF), rubidium chloride (RbCl), rubidium bromide (RbBr), rubidium iodide (RbI), cesium fluoride (CsF), cesium chloride (CsCl), cesium bromide (CsBr), cesium iodide (CsI), and mixed crystalline systems thereof.

The powder of the additive (guest) containing the ions as the luminescence center includes powder of a material selected so as to correspond to ions and selected as the luminescence center from a group of, based on $Tl^+$-type centers ($Tl^+$, $In^+$, $Sn^{2+}$, $Bi^{3+}$, $Cu^+$ (note that $Cu^+$ is $Tl^+$-type anion center)), halides thereof such as thallium chloride (TlCl), thallium bromide (TlBr), thallium iodide (TlI), indium chloride (InCl), indium bromide (InBr), indium iodide (InI), tin (II) chloride ($SnCl_2$), tin (II) bromide ($SnBr_2$), tin (II) iodide ($SnI_2$), bismuth (III) chloride ($BiCl_3$), bismuth (III) bromide ($BiBr_3$), bismuth (III) iodide ($BiI_3$), and copper iodide (CuI).

Alternatively, the powder includes powder of a material selected so as to correspond to selected ions as the luminescence center from a group of substances having $Tb^{3+}$ ions, $Eu^{3+}$ ions, $Ce^{3+}$ ions, and the like as rare earth ions as the luminescence center, that is, terbium (III) chloride ($TbCl_3$), terbium (III) bromide ($TbBr_3$), terbium (III) iodide ($TbI_3$), europium (III) chloride ($EuCl_3$), europium (III) bromide ($EuBr_3$), europium (III) iodide ($EuI_3$), cerium (III) chloride ($CeCl_3$), cerium (III) bromide ($CeBr_3$), and cerium (III) iodide ($CeI_3$).

Subsequently, the weighed alkali halide powder is put into the agate mortar (mortar), and is grinded while applying the mechanical energy based on the impact force, the shearing force, the shear stress, the friction force, or the like thereto (step S12: first process).

Then, it is determined whether a first predetermined period of time (for example, 10 minutes) has elapsed from start of the grinding processing at step S12 (step S13). As the first predetermined time, a period of time is previously obtained for which the alkali halide powder becomes fine enough to have a sufficient surface area.

In the determination at step S13, when the first predetermined period of time has not elapsed (No at step S13), the processing shifts to step S12 and the grinding processing is continued.

In the determination at step S13, when the first predetermined period of time has elapsed (Yes at step S13), the additive powder containing the ions as the luminescence center is added to the grinded alkali halide powder in the agate mortar (step S14). The adding amount (mol %) of the additive is required to be equal to or larger than an adding amount with which a doping amount of the ions as the luminescence center is sufficient so that sufficient luminescence efficiency is obtained and be smaller than an adding amount with which ions not contributing to luminescence are increased and usage efficiency of a material lowers.

In this case, it is desired that the adding amount (mol %) of the additive is set to mol % at which the intensity of a maximum luminescence wavelength of a single crystal of the alkali halide-based scintillator powder is maximum when the intensity is measured while the additive mol % is set as a variable.

Thereafter, grinding and mixing are performed while applying the mechanical energy based on the impact force, the shearing force, the shear stress, the friction force, or the like thereto and the ions as the luminescence center are doped into alkali halide as the base material (step S15: second process).

Then, it is determined whether a second predetermined period of time (for example, 10 minutes) has elapsed from start of the grinding and mixing processing at step S15 (step S16).

The second predetermined period of time, that is, time for which mechanical energy is applied for grinding or mixing the alkali halide powder as the base material and the additive or for applying the impact force, the shearing force, the shear stress, or the friction force in order to dope the ions as the luminescence center into alkali halide as the base material is desirably set to be equal to or longer than a period of time for which a luminescence spectrum obtained by irradiation of predetermined excitation light (including X rays) becomes a luminescence spectrum mainly of the ions as the luminescence center changed from a luminescence spectrum mainly of the alkali halide powder as the base material.

In the determination at step S16, when the second predetermined period of time has not elapsed (No at step S16), the processing shifts to step S15 and the grinding and mixing processing is continued.

In the determination at step S16, when the second predetermined period of time has elapsed (Yes at step S16), the doping of the ions as the luminescence center into the alkali halide powder as the base material is completed and the alkali halide-based scintillator powder is obtained. Then, the obtained alkali halide-based scintillator powder is put into a mold of a press device (not illustrated) and a predetermined pressure is applied thereto for press molding so as to prepare a scintillator plate (scintillator pellet) (step S17).

As described above, according to the embodiments, the alkali halide-based scintillator powder can be obtained simply by grinding and mixing the alkali halide powder as the base material and the additive powder containing the ions as the luminescence center using the mechanochemical process. This process enables the alkali halide-based scintillator powder to be obtained without any precise condition control.

Furthermore, the press molding can provide the scintillator sheet (scintillator material), thereby increasing the size of the scintillator sheet easily. In addition, the shape of the scintillator sheet can be easily changed by changing the mold.

Although the alkali halide-based scintillator powder is pressed at a normal temperature when the scintillator sheet (scintillator material) is manufactured in the above description, for example, hot press can be performed in a state of heating the mold to 150° C.

With this configuration, the doping of the ions as the luminescence center into the alkali halide powder as the base material is promoted so as to manufacture the scintillator sheet (scintillator material) stably.

Although the alkali halide-based scintillator powder is formed into the scintillator sheet in the above description, the scintillator material is not required to be limited to the sheet but may be used in the form of powder as it is or can be formed into another form such as a block (for example, rectangular parallelepiped).

In addition, powder can be embedded (filled) into a frame with fine grids so as to configure a scintillator unit.

Then, more specific embodiments will be described.

First, manufacturing procedures of powder and a scintillator sheet of thallium-activated cesium iodide as the alkali halide-based scintillator as an example will be described in detail.

Figure 2:
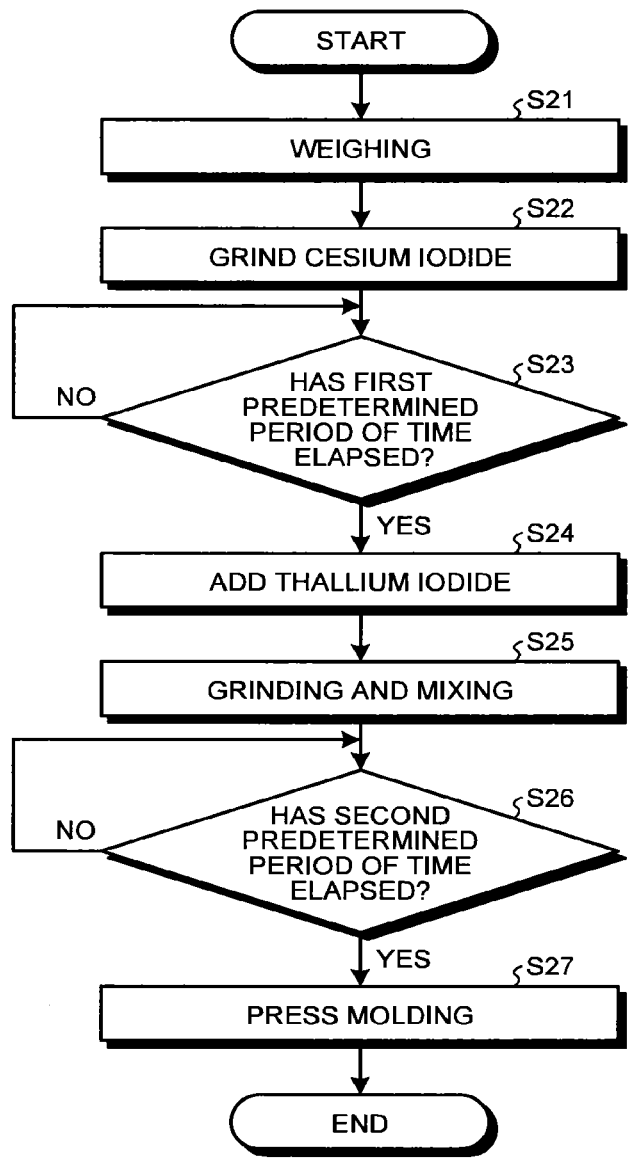
FIG. 2 is a descriptive flowchart for explaining manufacturing procedures of powder and a scintillator sheet of thallium-activated cesium iodide as the alkali halide-based scintillator as an example.

FIG. 2 is a descriptive flowchart for explaining the manufacturing procedures of the powder and the scintillator sheet of thallium-activated cesium iodide as the alkali halide-based scintillator as an example.

In the embodiments, when the thallium-activated cesium iodide powder as the alkali halide-based scintillator is manufactured, employed is a mechanochemical process in which powder of cesium iodide CsI that is alkali halide as the base material and powder of thallium iodide TlI that is the additive as the luminescence center are mixed and mechanical energy based on the impact force, the shearing force, the shear stress, the friction force, or the like is applied to the mixture for reaction.

First, when the thallium-activated cesium iodide powder as the alkali halide-based scintillator powder is manufactured, the powder of cesium iodide CsI that is alkali halide as the base material and the powder of thallium iodide TlI that is the additive as the luminescence center are weighed (step S21).

To be specific, cesium iodide CsI of 10 g (approximately 0.038 mol) and thallium iodide TlI of 0.013 g (approximately $3.9 \times 10^{-5}$ mol) are weighed.

Subsequently, weighed cesium iodide CsI is put into the agate mortar (mortar), and is grinded while applying the mechanical energy based on the impact force, the shearing force, the shear stress, the friction force, or the like thereto (step S22: first process).

Then, it is determined whether a first predetermined period of time (for example, 10 minutes) has elapsed from start of the grinding processing at step S22 (step S23).

In the determination at step S23, when the first predetermined period of time has not elapsed (No at step S23), the processing shifts to step S22 and the grinding processing is continued.

In the determination at step S23, when the first predetermined period of time has elapsed (Yes at step S23), the thallium iodide TlI powder is added to the grinded cesium iodide CsI powder in the agate mortar (step S24). The adding amount of thallium iodide TlI is desirably set to 0.01 mol % to 2.0 mol % for the following reason.

That is, when the adding amount of thallium iodide TlI is smaller than 0.01 mol %, a doping amount of thallium ions $Tl^+$ is small and sufficient luminescence efficiency cannot be obtained. On the other hand, when the adding amount is larger than 2.0 mol %, thallium iodide TlI that does not contribute to the luminescence increases and usage efficiency of the material lowers.

In the case of the above-mentioned example, the concentration of the added thallium iodide TlI powder is approximately 0.1 mol %.

In this case, it is desired that mol % (predetermined mol %) of thallium iodide TlI as the adding amount of thallium iodide TlI is set to mol % at which the intensity of a maximum luminescence wavelength of a thallium-activated cesium iodide single crystal as the alkali halide-based scintillator powder is maximum when the intensity is measured while mol % of thallium iodide TlI as the additive is set as a variable.

Thereafter, grinding and mixing are performed while applying the mechanical energy based on the impact force, the shearing force, the shear stress, the friction force, or the like and thallium iodide TlI is doped into cesium iodide CsI (step S25: second process).

Then, it is determined whether a second predetermined period of time (for example, 10 minutes) has elapsed from start of the grinding and mixing processing at step S25 (step S26).

In the determination at step S26, when the second predetermined period of time has not elapsed (No at step S26), the processing shifts to step S25 and the grinding and mixing processing is continued.

In the determination at step S26, when the second predetermined period of time has elapsed (Yes at step S26), the doping of thallium iodide TlI into cesium iodide CsI is completed and thallium-activated cesium iodide powder is obtained. Then, the obtained thallium-activated cesium iodide powder is put into a mold of a press device (not illustrated) and a predetermined pressure is applied for press molding so as to prepare a scintillator plate (scintillator pellet) (step S27).

As described above, the thallium-activated cesium iodide powder can be obtained simply by grinding and mixing the cesium iodide powder and the thallium iodide powder using the mechanochemical process. This process enables the thallium-activated cesium iodide powder to be obtained without any precise condition control.

Furthermore, the press molding can provide the scintillator sheet (scintillator material), thereby increasing the size of the scintillator sheet easily. In addition, the shape of the scintillator sheet can be easily changed by changing the mold.

Although the thallium-activated cesium iodide powder is pressed at a normal temperature when the scintillator sheet (scintillator material) is manufactured in the above description, for example, hot press can be performed in a state of heating the mold to 150° C.

With this configuration, the doping of the thallium ions into the cesium iodide powder is promoted so as to manufacture the scintillator sheet (scintillator material) stably.

Although thallium-activated cesium iodide CsI (TlI) is used as the alkali halide-based scintillator in the above description of the embodiments, the alkali halide-based scintillator is not limited thereto.

EXAMPLES

Next, examples will be described in detail.

A. (First) Example of Thallium-Activated Cesium Iodide Powder

First, the following describes an example in which when thallium-activated cesium iodide powder is manufactured as alkali halide-based scintillator powder, cesium iodide CsI is used as alkali halide as a base material and thallium iodide TlI is used as an additive.

In this case, cesium iodide CsI is alkali halide as the base material and thallium iodide TlI is the additive as the luminescence center.

Anhydrous cesium iodide having a beads-like shape, a particle diameter of equal to or smaller than 10 meshes, and purity of 99.999% was used as cesium iodide CsI.

Thallium iodide TlI having purity of 99.99% was used.

Cesium iodide CsI of 10 g was put into an agate mortar (inner diameter of φ90 mm, outer diameter of φ110 mm, depth of 38 mm) and was grinded by a pestle for 10 minutes so as to prepare a sample. The sample of 180 g in this state was weighed, was put into a mold having an inner diameter of approximately φ7 mm, and was pressed at a force of 800 kgf (nearly equal to pressure of 204 MPa) for 1 minute. The obtained pellet having the outer diameter of φ7 mm and the thickness of 1 mm was provided as a first comparative example C1.

Then, thallium iodide TlI of 0.013 g (concentration 0.1 mol %) was added. The sample of 180 g in this state was weighed, was put into a mold having an inner diameter of approximately φ7 mm, and was pressed at a force of 800 kgf for 1 minute. The obtained pellet having the outer diameter of φ7 mm and the thickness of 1 mm was provided as a second comparative example C2.

Subsequently, it was grinded and mixed by the pestle for 1 minute. The sample of 180 g obtained at this time was weighed, was put into a mold having an inner diameter of approximately φ7 mm, and was pressed at a force of 800 kgf for 1 minute. The obtained pellet having the outer diameter of φ7 mm and the thickness of 1 mm was provided as a third comparative example C3.

Furthermore, it was grinded and mixed for 10 minutes in total. The sample of 180 g obtained at this time was weighed, was put into a mold having an inner diameter of approximately φ7 mm, and was pressed at a force of 800 kgf for 1 minute. The obtained pellet having the outer diameter of φ7 mm and the thickness of 1 mm was provided as a first example E1.

It was further grinded and mixed for 30 minutes in total. The sample of 180 g obtained at this time was weighed, was put into a mold having an inner diameter of approximately φ7 mm, and was pressed at a force of 800 kgf for 1 minute. The obtained pellet having the outer diameter of φ7 mm and the thickness of 1 mm was provided as a second example E2.

Moreover, it was grinded and mixed for 60 minutes in total. The sample of 180 g obtained at this time was weighed, was put into a mold having an inner diameter of approximately φ7 mm, and was pressed at a force of 800 kgf for 1 minute. The obtained pellet having the outer diameter of φ7 mm and the thickness of 1 mm was provided as a third example E3.

A luminescence spectrum was measured under the following conditions.
1. Excitation light source: IK3452R-F He—Cd laser manufactured by Kimmon Manufacturing Co., Ltd.
    Oscillation wavelength 325 nm, output power 10 mW
2. Detector: MAYA2000PRO manufactured by Ocean Optics, Inc.
    Rear incidence 2D detector multichannel spectrometer including a rear incidence-type FFT-CCD
    Grating: measurement wavelength range of 200 nm to 1100 nm: HC-1
    Slit: 5 μm
    Detector with secondary light cut-off filter: OFV-200

Figure 3:
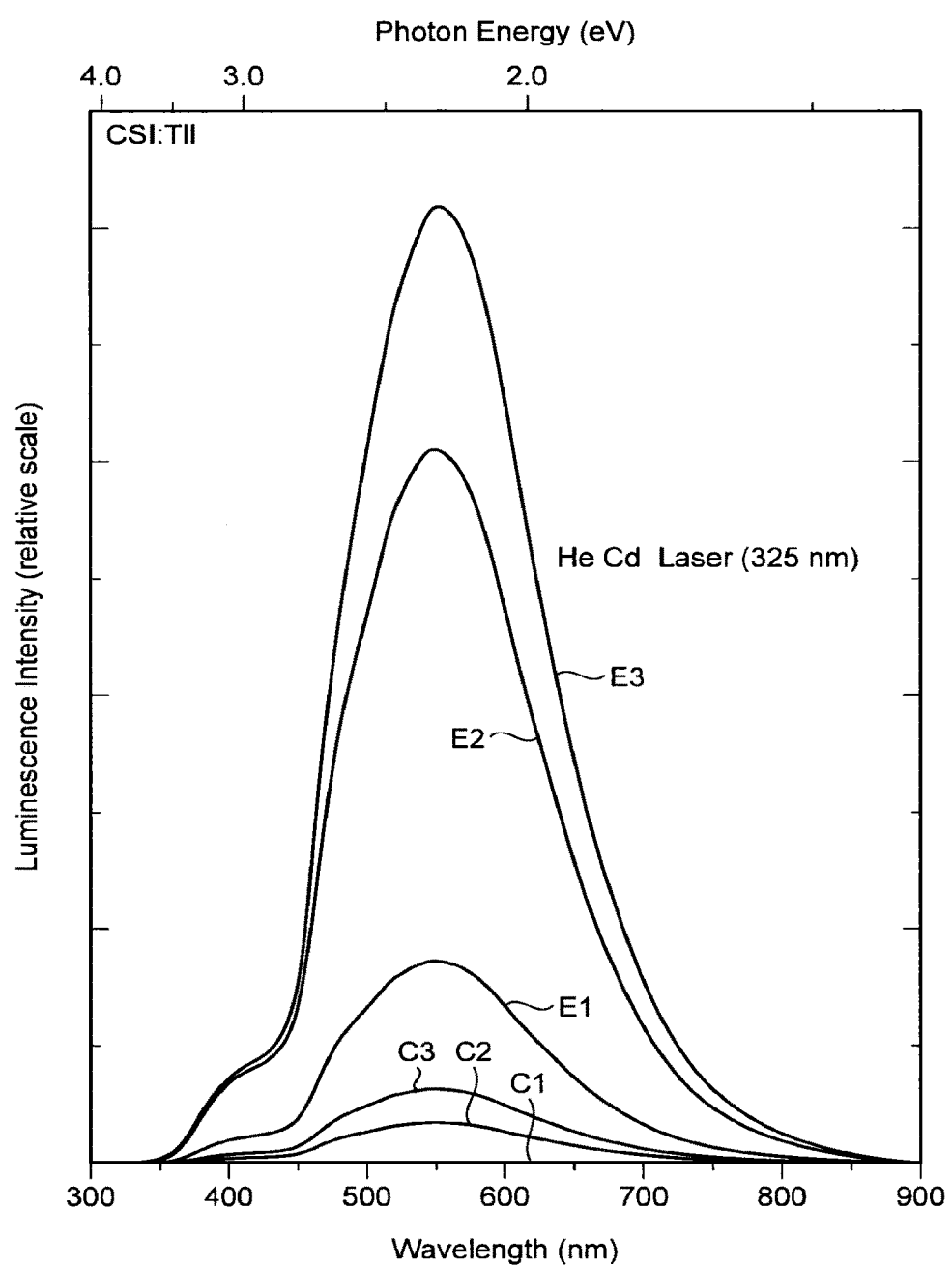
FIG. 3 is a descriptive graph for explaining relations between comparative examples and examples and luminescence intensities.

FIG. 3 is a descriptive graph for explaining results of luminescence spectrum measurement.

As illustrated in FIG. 3, luminescence was not observed in the first comparative example C1.

The intensity of a luminescence band related to the $Tl^+$ luminescence center in the second comparative example C2, the third comparative example C3, and the first example E1 to the third example E3 increased as the period of time of the grinding and mixing was made longer.

As illustrated in FIG. 3, weak luminescence was also observed in the second comparative example C2 involving mixing alone. The luminescence peak of the luminescence, however, shifted to the short wavelength side relative to an original luminescence peak of scintillator luminescence of $CsI:Tl^+$.

This is considered to occur because the $Tl^+$ ions do not diffuse in crystals and luminescence is derived from the $Tl^+$ ions adhering to the surfaces of CsI particles.

In the third comparative example C3 in which the mixing and grinding were performed for 1 minute, the luminescence intensity increased, and the luminescence peak did not reach the original luminescence peak of the scintillator luminescence of thallium-activated cesium iodide $CsI:Tl^+$ but shifted to the long wavelength side.

In the first example E1 in which the mixing and grinding were performed for 10 minutes, the luminescence intensity was further increased and the luminescence peak was similar to the original luminescence peak of the scintillator luminescence of thallium-activated cesium iodide $CsI:Tl^+$.

This is considered to occur because the mixing and grinding for 10 minutes cause the thallium ions $Tl^+$ to diffuse in the particles of cesium iodide CsI so as to form thallium-activated cesium iodide ($CsI:Tl^+$).

Figure 4:
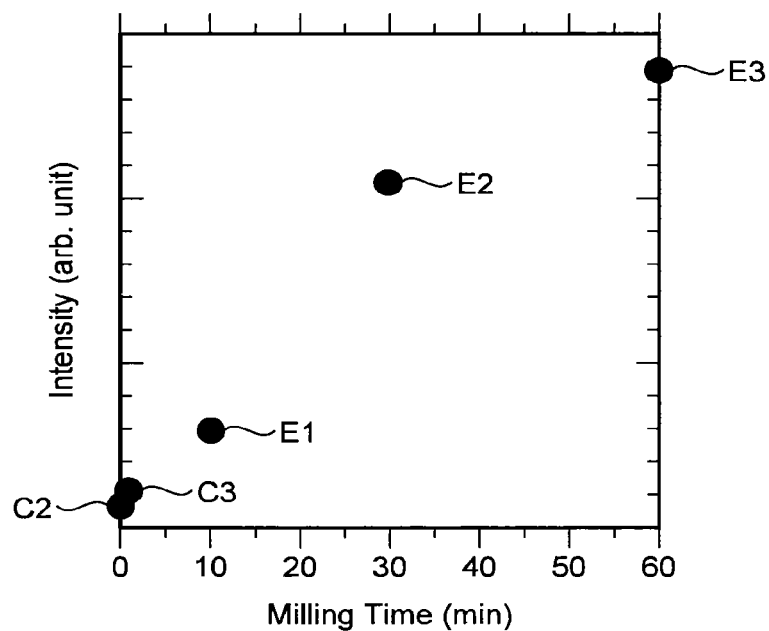
FIG. 4 is a descriptive graph for explaining relations between the comparative examples and the examples and the luminescence intensities in a (first) example of thallium-activated cesium iodide powder.

FIG. 4 is a descriptive graph for explaining relations between the luminescence intensity and the comparative examples and the examples in the (first) example of thallium-activated cesium iodide powder.

In the second example E2 and the third example E3 in which the mixing and grinding were performed for 30 minutes and 60 minutes, respectively, the intensity of the luminescence peak was further increased. To be more specific, as illustrated in FIG. 3, the intensity of the luminescence peak (550 nm) in the third example E3 in which the mixing and grinding were performed for 60 minutes was approximately five times as that in the first example E1 in which the mixing and grinding were performed for 10 minutes.

This result reveals the following. That is, using the mechanochemical process instead of the conventional evaporation method or the vacuum Bridgman method in which the high-temperature process (>600° C.) under high vacuum (pressure of lower than $3 \times 10^{-3}$ Pa) is considered to be essential, mechanical energy is applied for grinding or mixing the cesium iodide powder as alkali halide that is the base material of the alkali halide-based scintillator powder and the thallium iodide powder that is the additive as the luminescence center for equal to or longer than the predetermined period of time (preferably, equal to or longer than 10 minutes) at the room temperature in the atmospheric air or for applying the impact force, the shearing force, the shear stress, or the friction force. With this process, thallium iodide TlI as the luminescence center diffuses in the particles of cesium iodide CsI as the base material, and the thallium ions $Tl^+$ forms the luminescence center so as to obtain the thallium-activated cesium iodide powder for the alkali halide-based scintillator.

Furthermore, it was found that the scintillator sheet (scintillator plate) can be obtained by the press molding, thereby increasing the size of the scintillator sheet easily. An Al film or the like as a reflecting plate for reflecting emitted light is bonded to one surface of the scintillator sheet, so that light taken from the other opposing surface of the sheet can be increased.

In addition, the powder can be embedded (filled) into the frame with fine grids so as to configure a scintillator unit for easy handling.

B. (Second) Example of Thallium-Activated Cesium Iodide Powder

Next, when thallium-activated cesium iodide powder is manufactured as the alkali halide-based scintillator powder, as an example, cesium iodide CsI is used as alkali halide as the base material and thallium bromide TlBr is used as the additive.

In this case, the manufacturing method is the same as the case in which the thallium-activated cesium iodide powder is manufactured using cesium iodide CsI as alkali halide as the base material and thallium iodide TlI as the additive, and only results of luminescence spectrum measurement are described.

Thallium bromide TlBr having purity of 99.99% was used.

Cesium iodide CsI of 10 g was put into the agate mortar (inner diameter of φ90 mm, outer diameter of φ110 mm, depth of 38 mm) and was grinded by the pestle for 10 minutes (=first predetermined period of time). Then, thallium bromide TlBr of 0.011 g (concentration 0.1 mol %) was added. The sample of 110 g in this state was weighed, was put into a mold having an inner diameter of approximately φ6 mm, and was pressed at a force of 1000 kgf for 1 minute. The obtained pellet having the outer diameter of φ6 mm and the thickness of 1 mm was provided as a first example E11.

Furthermore, it was grinded and mixed for 30 minutes in total. The sample of 110 g obtained at this time was weighed, was put into a mold having an inner diameter of approximately φ6 mm, and was pressed at a force of 1000 kgf for 1 minute. The obtained pellet having the outer diameter of φ6 mm and the thickness of 1 mm was provided as a second example E12.

It was further grinded and mixed for 60 minutes in total. The sample of 110 g obtained at this time was weighed, was put into a mold having an inner diameter of approximately φ6 mm, and was pressed at a force of 1000 kgf for 1 minute. The obtained pellet having the outer diameter of φ6 mm and the thickness of 1 mm was provided as a third example E13.

Subsequently, a luminescence spectrum was measured under the same conditions as those in the (first) example of the thallium-activated cesium iodide powder.

Figure 5:
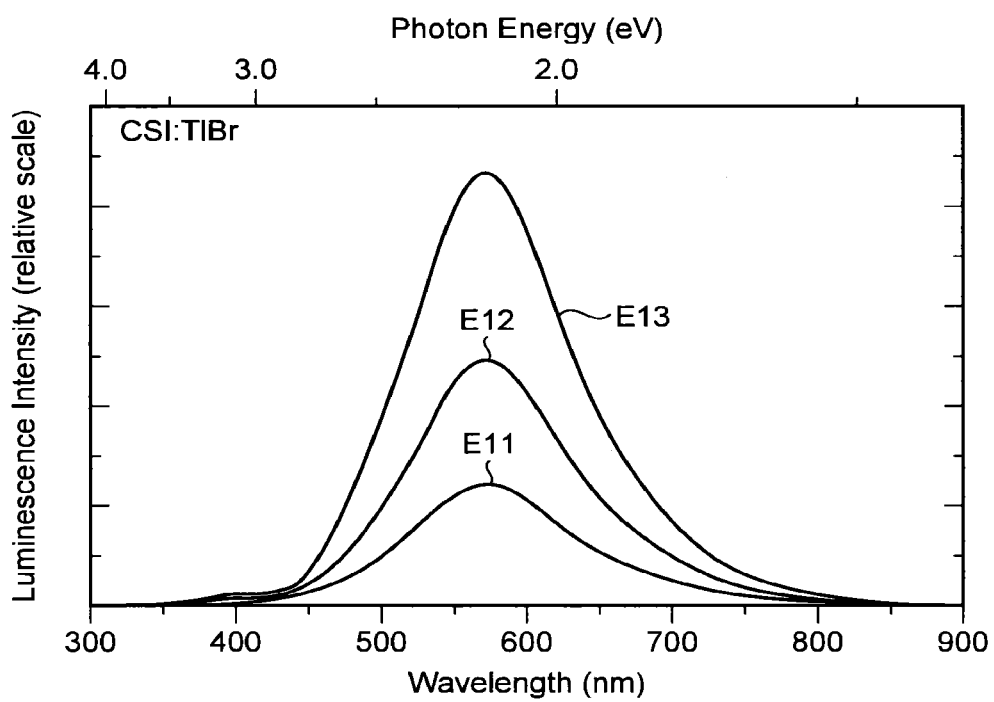
FIG. 5 is a descriptive graph for explaining relations of the luminescence intensities in a (second) example of thallium-activated cesium iodide powder.

FIG. 5 is a descriptive graph for explaining relations of the luminescence intensity in the (second) example of the thallium-activated cesium iodide powder.

The result demonstrates that, as illustrated in FIG. 5, in the first example E11 in which the mixing and grinding were performed for 10 minutes, the luminescence peak was similar to the original luminescence peak of the scintillator luminescence of thallium-activated cesium iodide $CsI:Tl^+$.

This is considered to occur because the mixing and grinding for 10 minutes cause the thallium ions $Tl^+$ to diffuse in the particles of cesium iodide CsI so as to form thallium-activated cesium iodide ($CsI:Tl^+$).

Furthermore, it is found that in the second example E12 and the third example E13 in which the mixing and grinding were performed for 30 minutes and 60 minutes, respectively, the intensity of the luminescence peak is further increased in comparison with that in the first example E11.

C. Example of Copper-Activated Cesium Iodide Powder

Next, when copper-activated cesium iodide powder is manufactured as the alkali halide-based scintillator powder, cesium iodide CsI is used as alkali halide as the base material and copper iodide CuI is used as the additive as an example.

In this case, the manufacturing method is the same as the case in which the thallium-activated cesium iodide powder is manufactured using cesium iodide CsI as alkali halide as the base material and thallium iodide TlI as the additive, and only results of luminescence spectrum measurement are described.

Copper iodide CuI having purity of 99.99% was used.

Cesium iodide CsI of 10 g was put into the agate mortar (inner diameter of φ90 mm, outer diameter of φ110 mm, depth of 38 mm) and was grinded by the pestle for 10 minutes (=first predetermined period of time). Then, copper iodide CuI of 0.07 g (concentration 1.0 mol %) was added. The sample of 110 g in this state was weighed, was put into a mold having an inner diameter of approximately φ6 mm, and was pressed at a force of 1000 kgf for 1 minute. The obtained pellet having the outer diameter of φ6 mm and the thickness of 1 mm was provided as a first example E21.

Furthermore, it was grinded and mixed for 30 minutes in total. The sample of 110 g obtained at this time was weighed, was put into a mold having an inner diameter of approximately φ6 mm, and was pressed at a force of 1000 kgf for 1 minute. The obtained pellet having the outer diameter of φ6 mm and the thickness of 1 mm was provided as a second example E22.

It was further grinded and mixed for 60 minutes in total. The sample of 110 g obtained at this time was weighed, was put into a mold having an inner diameter of approximately φ6 mm, and was pressed at a force of 1000 kgf for 1 minute. The obtained pellet having the outer diameter of φ6 mm and the thickness of 1 mm was provided as a third example E23.

Subsequently, a luminescence spectrum was measured under the same conditions as those in the above-mentioned other examples except the following condition.

1. Excitation Light Source: ArF excimer laser (oscillation wavelength 193 nm)

Figure 6:
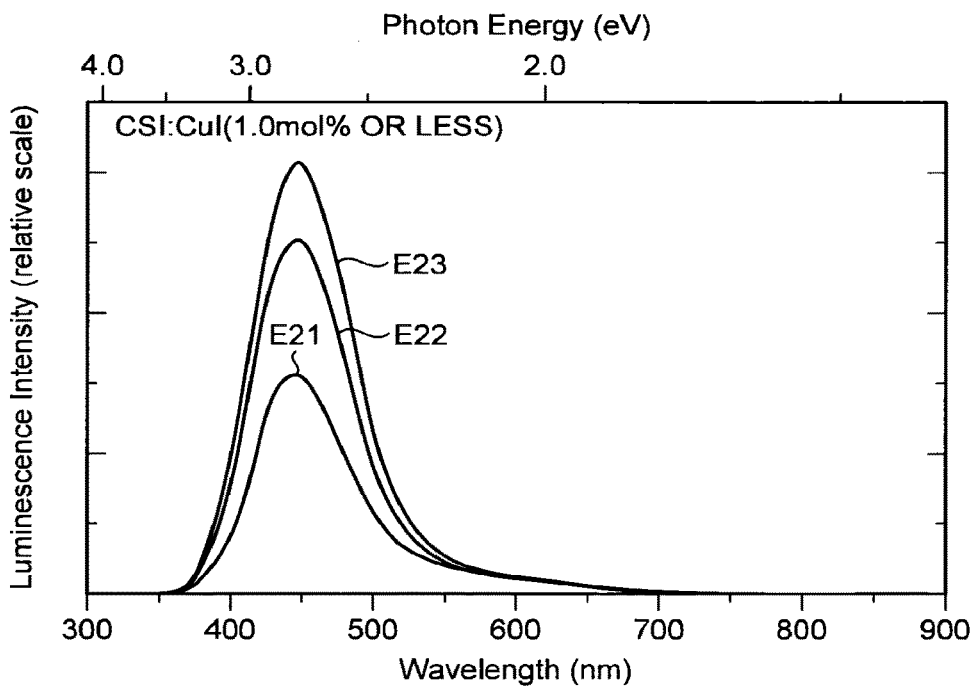
FIG. 6 is a descriptive graph for explaining relations of the luminescence intensities in an example of copper-activated cesium iodide powder.
Figure 7:
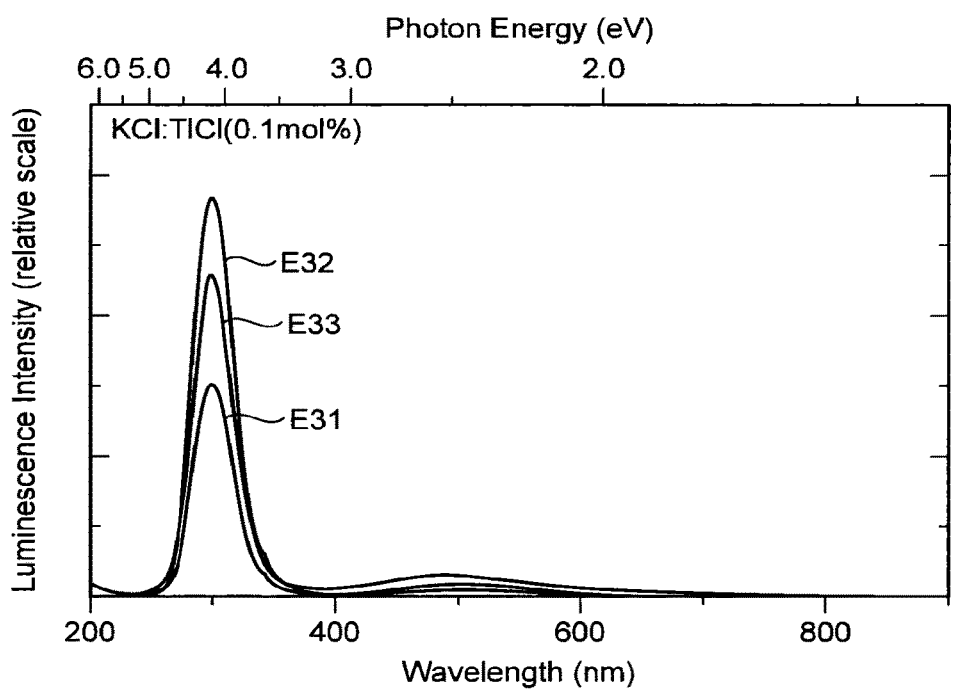
FIG. 7 is a descriptive graph for explaining relations of the luminescence intensities in an example of thallium-activated potassium chloride powder and FIG. 8 is a descriptive graph for explaining relations of the luminescence intensities in an example of thallium-activated potassium bromide powder.
Figure 8:
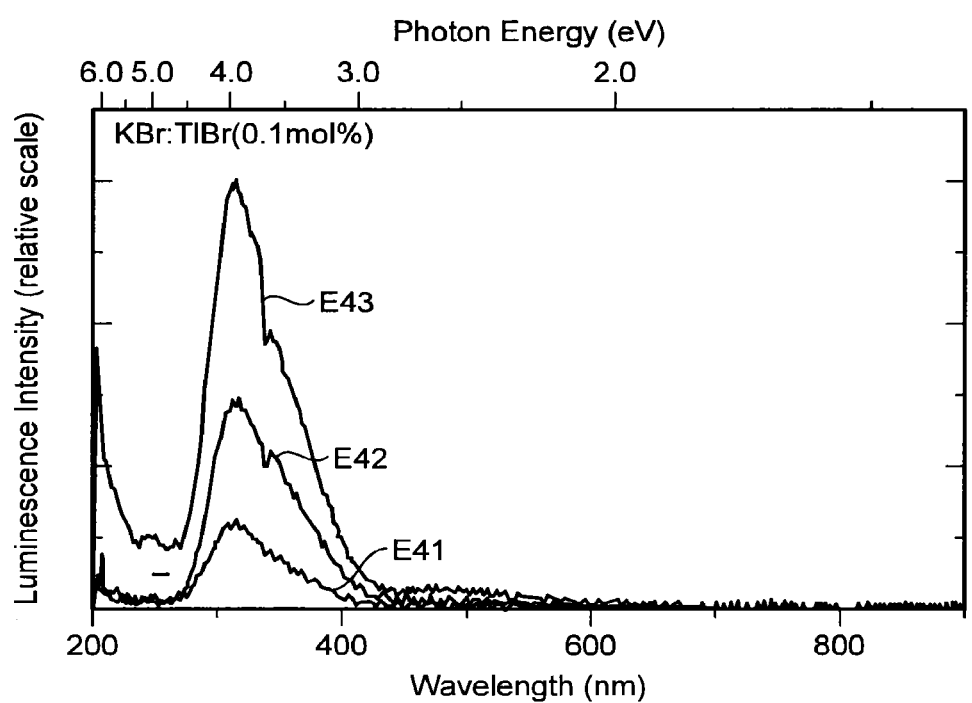

FIG. 6 is a descriptive graph for explaining relations of the luminescence intensity in an example of the copper-activated cesium iodide powder.

The result demonstrates that, in the first example E21 in which the mixing and grinding were performed for 10 minutes, the luminescence peak was similar to the original luminescence peak of the scintillator luminescence of copper-activated cesium iodide $CsI:Cu^-$.

This is considered to occur because the mixing and grinding for 10 minutes cause copper anions $Cu^-$ to diffuse in the particles of cesium iodide CsI so as to form copper-activated cesium iodide ($CsI:Cu^-$).

Furthermore, it is found that in the second example E22 and the third example E23 in which the mixing and grinding were performed for 30 minutes and 60 minutes, respectively, the intensity of the luminescence peak is further increased in comparison with that in the first example E21.

D. Example of Thallium-Activated Potassium Chloride Powder

Next, when thallium-activated potassium chloride powder is manufactured as the alkali halide-based scintillator powder, as an example, potassium chloride KCl is used as alkali halide as the base material and thallium chloride TlCl is used as the additive.

In this case, the manufacturing method is the same as the case in which the thallium-activated cesium iodide powder is manufactured using cesium iodide CsI as alkali halide as the base material and thallium iodide TlI as the additive, and only results of luminescence spectrum measurement are described.

Potassium chloride having a beads-like shape, a particle diameter of equal to or smaller than 10 meshes, and purity of 99.9% was used as potassium chloride KCl.

Thallium chloride TlCl having purity of 99.9% was used.

Potassium chloride KCl of 10 g was put into the agate mortar (inner diameter of φ90 mm, outer diameter of φ110 mm, depth of 38 mm) and was grinded by the pestle for 10 minutes (=first predetermined period of time). Then, thallium chloride TlCl of 0.032 g (concentration 0.1 mol %) was added. The sample of 56 g in this state was weighed, was put into a mold having an inner diameter of approximately φ6 mm, and was pressed at a force of 1000 kgf for 1 minute.

The obtained pellet having the outer diameter of φ6 mm and the thickness of 1 mm was provided as a first example E31.

Furthermore, it was grinded and mixed for 30 minutes in total. The sample of 56 g obtained at this time was weighed, was put into a mold having an inner diameter of approximately φ6 mm, and was pressed at a force of 1000 kgf for 1 minute. The obtained pellet having the outer diameter of φ6 mm and the thickness of 1 mm was provided as a second example E32.

It was further grinded and mixed for 60 minutes in total. The sample of 56 g obtained at this time was weighed, was put into a mold having an inner diameter of approximately φ6 mm, and was pressed at a force of 1000 kgf for 1 minute. The obtained pellet having the outer diameter of φ6 mm and the thickness of 1 mm was provided as a third example E33.

Then, a luminescence spectrum was measured under the same conditions as those in the above-mentioned other examples except the following condition.
1. Excitation Light Source: ArF excimer laser (oscillation wavelength 193 nm)

The result demonstrates that, in the first example E31 in which the mixing and grinding were performed for 10 minutes, the luminescence peak was similar to the original luminescence peak of the scintillator luminescence of thallium-activated potassium chloride $KCl:Tl^+$.

This is considered to occur because the mixing and grinding for 10 minutes cause thallium ions $Tl^+$ to diffuse in the particles of potassium chloride KCl so as to form thallium-activated potassium chloride ($KCl:Tl^+$).

Furthermore, it is found that in the second example E32 and the third example E33 in which the mixing and grinding were performed for 30 minutes and 60 minutes, respectively, the intensity of the luminescence peak is further increased in comparison with that in the first example E31.

E. Example of Thallium-Activated Potassium Bromide Powder

Next, when thallium-activated potassium bromide powder is manufactured as the alkali halide-based scintillator powder, as an example, potassium bromide KBr is used as alkali halide as the base material and thallium bromide TlBr is used as the additive.

In this case, the manufacturing method is the same as the case in which the thallium-activated cesium iodide powder is manufactured using cesium iodide CsI as alkali halide as the base material and thallium iodide TlI as the additive, and only results of luminescence spectrum measurement are described.

Potassium bromide KBr having a beads-like shape, a particle diameter of equal to or smaller than 10 meshes, and purity of 99.9% was used.

Thallium bromide TlBr having purity of 99.9% was used. Potassium bromide KBr of 10 g was put into the agate mortar (inner diameter of (290 mm, outer diameter of (2110 mm, depth of 38 mm) and was grinded by the pestle for 10 minutes (=first predetermined period of time). Then, thallium bromide TlBr of 0.024 g (concentration 0.1 mol %) was added. The sample of 75 g in this state was weighed, was put into a mold having an inner diameter of approximately φ6 mm, and was pressed at a force of 1000 kgf for 1 minute. The obtained pellet having the outer diameter of φ6 mm and the thickness of 1 mm was provided as a first example E41.

It was further grinded and mixed for 60 minutes in total. The sample of 75 g obtained at this time was weighed, was put into a mold having an inner diameter of approximately φ6 mm, and was pressed at a force of 1000 kgf for 1 minute.

The obtained pellet having the outer diameter of φ6 mm and the thickness of 1 mm was provided as a third example E43.

Subsequently, a luminescence spectrum was measured under the same conditions as those in the above-mentioned example of the thallium-activated potassium chloride powder.

The result demonstrates that, in the first example E41 in which the mixing and grinding were performed for 10 minutes, the luminescence peak was similar to the original luminescence peak of the scintillator luminescence of thallium-activated potassium bromide $KBr:Tl^+$.

This is considered to occur because the mixing and grinding for 10 minutes cause the thallium ions $Tl^+$ to diffuse in the particles of potassium bromide KBr so as to form thallium-activated potassium bromide ($KBE\ Tl^+$).

Furthermore, it is found that in the second example E42 and the third example E43 in which the mixing and grinding were performed for 30 minutes and 60 minutes, respectively, the intensity of the luminescence peak is further increased in comparison with that in the first example E41.

Although a plurality of examples have been described, the invention can be applied to other alkali halides as the base material and other additives containing ions as the luminescence center in the same manner.

The invention claimed is:

1. A method for manufacturing a copper-activated cesium iodide $CsI:Cu^+$ scintillator powder, the method comprising:
   adding CuI comprising a $Cu^+$ ion luminescence center to a CsI powder base material; and
   applying an impact force, a shearing force, a shear stress, or a friction force so as to grind or mix the CsI powder base material and the CuI together and dope the $Cu^+$ ion luminescence center into the CsI powder base material, thereby obtaining the copper-activated cesium iodide $CsI:Cu^+$ scintillator powder.

2. The method of claim 1, wherein the impact force, shearing force, shear stress, or friction force is applied by a mortar, a tumbling mill, a satellite mill, or a jet mill.

3. The method of claim 1, wherein a period of time for which the impact force, shearing force, shear stress, or friction force is applied is set to be equal to or longer than a period of time for which a luminescence spectrum obtained by emitting predetermined excitation light (including X rays) becomes a luminescence spectrum of desired copper-activated cesium iodide $CsI:Cu^+$ scintillator powder containing the $Cu^+$ ion as the luminescence center from a luminescence spectrum of the CsI powder.

4. The method of claim 1, further comprising:
   weighing the copper-activated cesium iodide $CsI:Cu^+$ scintillator powder; and
   adding the weighed copper-activated cesium iodide $CsI:Cu^+$ scintillator powder into a mold and pressing the copper-activated cesium iodide $CsI:Cu^+$ scintillator powder at a predetermined pressure so as to manufacture a scintillator sheet.

5. The method of claim 4, wherein, when the copper-activated cesium iodide $CsI:Cu^+$ scintillator powder is pressed at the predetermined pressure, hot press is performed in a state where the mold is heated to a predetermined temperature.

6. The method of claim 5, further comprising bonding a reflecting plate to one surface of the scintillator sheet after the pressing at the predetermined pressure.

7. The method of claim 1, further comprising:
   weighing the copper-activated cesium iodide $CsI:Cu^+$ scintillator powder; and embedding the weighed copper-activated cesium iodide CsI:Cu$^+$ scintillator powder into a frame with grids so as to manufacture a scintillator unit.

8. The method of claim 1, further comprising, before said adding, grinding said CsI powder base material.

9. The method of claim 1, comprising applying said impact force to grind or mix the CsI powder base material and the CuI together and dope the Cu$^+$ ion luminescence center into the CsI powder base material.

10. The method of claim 1, comprising applying said shearing force to grind or mix the CsI powder base material and the CuI together and dope the Cu$^+$ ion luminescence center into the CsI powder base material.

11. The method of claim 1, comprising applying said shear stress to grind or mix the CsI powder base material and the CuI together and dope the Cu$^+$ ion luminescence center into the CsI powder base material.

12. The method of claim 1, comprising applying said friction force to grind or mix the CsI powder base material and the CuI together and dope the Cu$^+$ ion luminescence center into the CsI powder base material.

* * * * *